(12) United States Patent
Minneman et al.

(10) Patent No.: US 6,846,085 B2
(45) Date of Patent: Jan. 25, 2005

(54) MITIGATING THE EFFECTS OF MINIATURIZING INTEGRATING SPHERES FOR FIBER OPTIC MEASUREMENT

(75) Inventors: Michael Paul Minneman, Broomfield, CO (US); Douglas Fredrick Zahn, Brier, WA (US); Elwood James Egerton, Longmont, CO (US)

(73) Assignee: DBM Optics, Incorporated, Lafayette, CO (US)

( * ) Notice: Subject to any disclaimer, the term of this patent is extended or adjusted under 35 U.S.C. 154(b) by 183 days.

(21) Appl. No.: 10/053,751

(22) Filed: Jan. 21, 2002

(65) Prior Publication Data

US 2002/0105739 A1 Aug. 8, 2002

Related U.S. Application Data

(60) Provisional application No. 60/262,753, filed on Jan. 19, 2001, and provisional application No. 60/264,947, filed on Jan. 30, 2001.

(51) Int. Cl.[7] .............................................. G02B 5/08
(52) U.S. Cl. ..................... 359/838; 359/846; 359/847
(58) Field of Search ................................ 359/838–839, 359/846–847, 853–858, 867–868, 707–711; 356/236, 402, 243, 319, 418–419, 445–446; 250/228

(56) References Cited

U.S. PATENT DOCUMENTS

| | | | | |
|---|---|---|---|---|
| 4,658,131 A | * | 4/1987 | Stark | 250/228 |
| 4,995,727 A | * | 2/1991 | Kawagoe et al. | 356/402 |
| 5,034,609 A | * | 7/1991 | Satake et al. | 250/339.11 |
| 5,997,155 A | * | 12/1999 | Ducharme et al. | 362/298 |
| 6,222,623 B1 | * | 4/2001 | Wetherell | 356/236 |
| 6,424,413 B1 | * | 7/2002 | Weber et al. | 356/236 |
| 6,737,637 B1 | * | 5/2004 | Balster et al. | 250/228 |

* cited by examiner

*Primary Examiner*—Mohammad Sikder
(74) *Attorney, Agent, or Firm*—Renner, Otto, Boisselle, & Sklar, LLP

(57) ABSTRACT

An miniature integrating sphere has a spherical volume with walls of a material for reflecting light, a light inlet and a light outlet. The light inlet is offset from a diameter axis of the spherical volume and the light inlet and light outlet are offset at non-perpendicular and non-parallel relation to each other. The light inlet is molded or milled to a shape conforming to the shape of the cone of light provided by a fiber optic device as an input to the integrating sphere. A number of miniature integrating spheres may be used respectively in plural channels of an optical measurement instrument.

35 Claims, 5 Drawing Sheets

MITIGATING THE EFFECTS OF MINIATURIZING INTEGRATING SPHERES FOR FIBER OPTIC MEASUREMENT

CROSS-REFERENCE TO RELATED APPLICATIONS

This application claims the benefit of U.S. Provisional Application Ser. No. 60/262,753, filed Jan. 19, 2001 and U.S. Provisional Application Ser. No. 60/264,947, filed Jan. 30, 2001.

TECHNICAL FIELD

The present invention relates generally to the field of optical measurements and, more particularly, to measurement of light transmitted in fiber optic devices using integrating spheres. Moreover, the invention relates to mitigating the effects of miniaturizing integrating spheres for fiber optic measurement.

BACKGROUND

The use of optical signals for communications and for other purposes is increasing. Typically, optical signals are transmitted from one location to another via fiber optic devices, an example of which is an optical fiber. Optical circuits and other optical equipment used in optical communication systems include, for example, multiplexers, optical switches, cross connect devices, and/or communications to, form and/or between (or among) computers, and the like. Sometimes it is necessary to test the fiber optic devices themselves and/or the other optical equipment by measuring light. An exemplary device currently used to test fiber optic devices and components is the Hewlett-Packard model 81641A lightwave measurement system. Such measurement system and other optical measurement systems use a tunable laser system to supply light in the visible or other wavelength range to a device under test (sometimes referred to below as "DUT"), such as an optical fiber and/or other optical equipment. The output from the DUT may be measured using one or more optical power meters (sometimes referred to below as "OPM"). Fiber optic devices may be used to connect the tunable laser system to the DUT and to connect the DUT to one or more OPMs. It is desirable that the measurements made by the OPMs, for example, which measure optical power or intensity of an input, be reproducible, sometimes referred to as repeatable, for a given set of test conditions, such as, for example, wavelength and intensity or power of light from the tunable laser system and positioning, orientation, operation and/or setting of the DUT. However, it has been found that some errors have occurred in the past that negatively affected the reproducibility and, thus, the reliability of the measurements.

In FIG. 1 a prior art optical measurement system 10 is shown including a light input represented by an arrow 11, an optical integrating sphere 12, a light output 13, and an OPM 14, which includes a photosensitive detector 15, measurement circuitry 16, and an output circuit and display 17. The light input, such as a connection to a fiber optic device, is provided the conventional optical integrating sphere 12 at its light input port or opening 18, which is located to receive the light directed generally along an axis that is the same as a diameter of the integrating sphere. The light output 13 opening in the integrating sphere is along another diameter, which is perpendicular to the first-mentioned diameter. Input light reflects on the walls 19 facing the interior 20 of the integrating sphere 12 and eventually at least some of the light is directed out through the light output 13 for detection by the photosensitive device 15, which is outside the integrating sphere 12, as is represented by the dotted lines in FIG. 1.

In this patent application reference is made to electromagnetic energy, light, optical, optical power meter, and the like. It is intended that such references identify, broadly, electromagnetic energy that may be in the visible spectrum, in the infrared spectrum, including without limitation the near infrared and the far infrared spectra, ultraviolet spectrum, and/or the like. Thus, reference to light, optical, and/or to electromagnetic energy is not restricted to light in the visible range but also to light or electromagnetic energy in other ranges of the electromagnetic energy spectrum.

Typically an optical fiber either has an integrated connector or is put into a bare fiber adapter, which holds the fiber in a fixed location. Such integrated connector or bare fiber adapter is used to connect the optical fiber to a DUT and/or to an OPM in a test system of the type mentioned above. Measurement errors that affect reproducibility of measurements sometimes arise on account of different alignments and relationships of parts at connections between the fiber optic device and the DUT or OPM. One source of error is the different alignments of the end of the fiber optic device at the connection to the OPM or to the DUT, which is manifest by wiggling the connector or the fiber optic cable at the connection and observing changes in a measurement.

As is illustrated schematically in FIGS. 2A, 2B and 2C, sources of error in prior art optical measurement systems include Z-axis position of the optical fiber 21 output end portion or end face 22 (sometimes referred to as "output face" or "output end") of the optical fiber 21, X-Y position of the end face, bending of the end portion of the end portion, and/or rotation of the optical fiber about the Z-axis. Sometimes the end face 22 is cut on a bias or slope rather than being perpendicular to the axial extent of the optical fiber, and such slope further exacerbates the error problems. The end face 22 of the optical fiber 21 usually has been located in the input port 18 of an integrating sphere 12 associated with an OPM 14; and light from the end face 22 usually is distributed over a cone shape represented at 23 in FIG. 2A. Depending on the location and/or orientation of the end face 22 in the input port 18, some light from the cone 23 may impinge on and reflect from walls 24 of the input port; for different locations and orientations of the end face, then, it will be appreciated that the extent of such impingement and reflection will be different and may result indifferent measurements by the OPM 14 for the same intensity or power of input light provided by the optical fiber.

In FIG. 2A the Z-axis location of the end face 22 of the optical fiber 21 is shown at two different locations i and ii relative to the axial extent of the input port 18. With the end face 22 at the Z-axis location i, part 23$i$ of the cone 23 of light impinges on and reflects from walls 24 of the light input port 18, and the amount of light that so impinges and reflects depends on the Z-axis location of the end face 20. In contrast, with the end face 22 at Z-axis location ii, none of the cone 23 of light, as is represented at 23$ii$, does impinges on the walls 19, but rather the entire cone 23 of light directly enters into the interior 20 (FIG. 1) of the integrating sphere 12. Another similar source of error is the lateral offset of the end face 22 in the X- or Y-axial directions relative to the Z-axial extent of the light input port 18. FIG. 2B illustrates a bending of the optical fiber 21 relative to the linear axial extent of the light input port 18. In FIG. 2C the end face 22 of the optical fiber 21 is cut (faceted) on an angle (bias) other than perpendicular to the Z-axis direction so that light input to the interior 20 of the integrating sphere 12 will be directed away from that portion 19a of the wall 19 (FIG. 1), which is directly opposite the light input port 18, to avoid direct reflection back into the input port and subsequent loss of some light. However, as is represented by the arrow 27, polar rotation of the optical fiber 21 about the Z-axis may cause a corresponding variation in the angle at which the end face 22 faces to change the path that light takes into the integrating sphere 12 and, thus, may cause variation in the amount and direction of light that impinges on the walls 24.

Each of the above-mentioned variations depicted in FIGS. 2A, 2B, and 2C ordinarily would have minimal impact, if any impact at all, on measurements made by the photosensitive detector 15 of the OPM 14, provided the size of the integrating sphere 12 is relatively large, for example, larger than about 1½ inches or 2 inches interior diameter or even larger. However, as a conventional integrating sphere is miniaturized, for example, to a size on the order of about 1½ inches or smaller, even 1 inch or smaller, then such variations depicted in FIG. 2A, 2B, and 2C may have a substantial impact and, therefore, reduce reproducibility of measurements based on a light input with common characteristics.

Light integrating spheres have been used in the past to make high precision optical measurements. The integrating spheres have been relatively large, for example, larger in diameter than about 1.5 inches or 2 inches. The relatively large size of the integrating sphere in such a measurement instrument has been necessary to obtain substantial light diffusion, e.g., on account of number of bounces of light beams in the integrating sphere, thus minimizing the light lost by reflection back out through the light input port, avoiding light direction or light input device alignment affects, reducing the impact of optical polarization, and so forth. However, large integrating spheres are relatively expensive. Also, a measurement instrument that uses a large integrating sphere usually only has space for a single integrating sphere and, therefore, only one measurement can be made at a time, which slows the operation and limits versatility of the measurement instrument. Accordingly, it would be desirable to be able to use smaller integrating spheres in optical measurement equipment so that several measurements can be made simultaneously or nearly simultaneously, thus increasing the effective speed of the instrument operation and increase versatility of the instrument and its measurements. Even for a single measuring channel optical measurement instrument, it would be desirable to be able to use a smaller integrating sphere than was previously possible thereby to reduce instrument size.

However, miniaturization of the integrating sphere used in such measurement instruments may reduce the light diffusing and other intended functions of the integrating sphere, and, therefore, may reduce the reproducibility of measurements made by OPMs associated with reduced size integrating spheres. Several problems encountered due to miniaturization of integrating spheres for optical measurement instruments include, for example, increased percentage of reflected light lost through the light input port, polarization dependency, light input device position and alignment dependency, e.g., as shown in FIGS. 2A, 2B and/or 2C, and light loss at the detector port. Thus, there is a need to reduce these losses and errors to improve the reproducibility, repeatability and reliability of measurements made by optical measurement instruments, which utilize miniature integrating spheres.

The input light provided an integrating sphere and OPM may be optically polarized. The light reflection by the integrating sphere may depend on the polarization direction. Also, the sensitivity of the light detector in the OPM may be polarization direction dependent, and reflection from the detector itself may be polarization direction dependent. It is desirable to increase the number of reflections in the integrating sphere to randomize or to scramble the polarization direction and, therefore, to reduce the polarization dependency on light measurements by the OPM. Although relatively large integrating spheres tend to provide enough reflections to randomize the optical polarization, the smaller the integrating sphere, in the past the less randomizing would occur. Accordingly, it is desirable to provide for such randomizing for relatively small integrating spheres.

Light loss may occur at the light input port of an integrating sphere; some of the light is reflected back to the input port. Light leakage out the inlet port, such as the mentioned light which is reflected back; results in error in optical measurement. The smaller the integrating sphere, usually the larger the input port is relative to the total surface area of the integrating sphere and also the closer the input port is to the immediately opposite or back surface of the integrating sphere; and both of these conditions increase the quantity of light that may be directed back to the input port.

The light exiting an optical fiber usually forms a cone of light. If the size of the inlet port to an integrating sphere is relatively small to avoid reflected loss back out through the input port, then the above-mentioned possible misalignment of the output end of the optical fiber may result in light being reflected by surfaces of the light inlet port and the above-mentioned measurement errors.

Another loss encountered in optical measurement instruments, which use integrating spheres, is the loss around the detector port or light output port. Such loss may relate to the fact that there may be less than a perfect fit between the output port size and the light detector, thus allowing some light leakage. This light leakage as a percentage of the total area of the integrating sphere increases with miniaturization of the sphere. It is desirable to reduce such leakage and associated errors.

BRIEF SUMMARY OF THE INVENTION

Briefly, an aspect of the invention relates to reducing the size of an integrating sphere useful in an optical measurement system or the like while avoiding sources of error and/or minimizing errors previously encountered due to such a size reduction.

Another aspect of the invention relates to reducing the size of an integrating sphere useful in an optical measurement system or the like while maintaining repeatability, reproducibility and reliability of measurements thereby.

Another aspect relates to ensuring there is an adequate power-weighted average number of bounces (reflections) of light from the light input port of an integrating sphere prior to the light reaching the detector at the output port of the integrating sphere under conditions of varying or various input angles and/or X-, Y- and Z-axis variations.

Another aspect relates to ensuring there is an adequate power-weighted average number of bounces (reflections) of light from the light input port of a relatively small size integrating sphere prior to the light reaching the detector at the output port of the integrating sphere under conditions of varying or various input angles and/or X-, Y- and Z-axis variations.

According to an aspect of the invention, an integrating sphere includes a spherical volume having walls of a material for reflecting light, a light inlet and a light outlet, and wherein the light inlet is offset from a diameter axis of the spherical volume.

According to another aspect, an integrating sphere includes a spherical volume having walls of a material for reflecting light, a light inlet and a light outlet, wherein a diameter axis bounds two hemispheres of the spherical volume, the light inlet is in one hemisphere of the spherical volume, the light outlet is in the other hemisphere of the spherical volume, and relative to a diameter axis perpendicular to the first mentioned diameter axis, the light outlet is offset.

According to another aspect, an integrating sphere includes a spherical volume having walls of a material for reflecting light, a light inlet and a light outlet, and wherein the light inlet is tapered along at least part of its length from an inlet end to an outlet end from which light enters the spherical volume.

Another aspect relates to a relation between an optical integrating sphere and the end face of a fiber optic input device such that the optical fiber end face is nearly coincident with interior surface of the integrating sphere.

Another aspect is to mold or to mill the optical fiber input port to the size of the light cone thereby to minimize reflective losses back out of the integrating sphere and/or to minimize impingement of input light on the walls of the input port.

Another aspect is to position the optical fiber end face near-planar with the interior surface of the integrating sphere, thereby to minimize the light cone diameter and the resulting losses by using a very thin surface tangency.

Another aspect is to offset the light input port of an integrating sphere away from a diameter of the integrating sphere to minimize back refection out of the optical fiber input port.

Another aspect relates to placement of the output port from which light exits an integrating sphere and is measured by a light sensor such as a photodiode. The axis or line of sight of the output port is non-perpendicular to the axis or line of sight of the light input port. This arrangement helps assure maximum number of bounces of light in the integrating sphere between the input port and the output port. Increasing the number of bounces, the extent of diffusion of the light, randomness and/or scrambling of the polarization direction, and reproducibility of the measurements.

Another aspect of the invention relates to utilizing external light reflective material about part or all of an integrating sphere to minimize losses due to transmission through the walls of the integrating sphere.

Another aspect relates to a compact optical measurement instrument using a relatively small size integrating sphere.

Another aspect relates to optical measurement instruments having plural integrating spheres for use in measuring light in several respective channels.

Another aspect relates to integrating spheres and use thereof having a diameter that is on the order of about 1 and one half inches or smaller.

Another aspect relates to integrating spheres and use thereof having a diameter that is on the order of about 1 inch or smaller.

Another aspect relates to integrating spheres and use thereof having a diameter that is smaller than on the order of about 1 inch.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

DESCRIPTION

Figure 3:
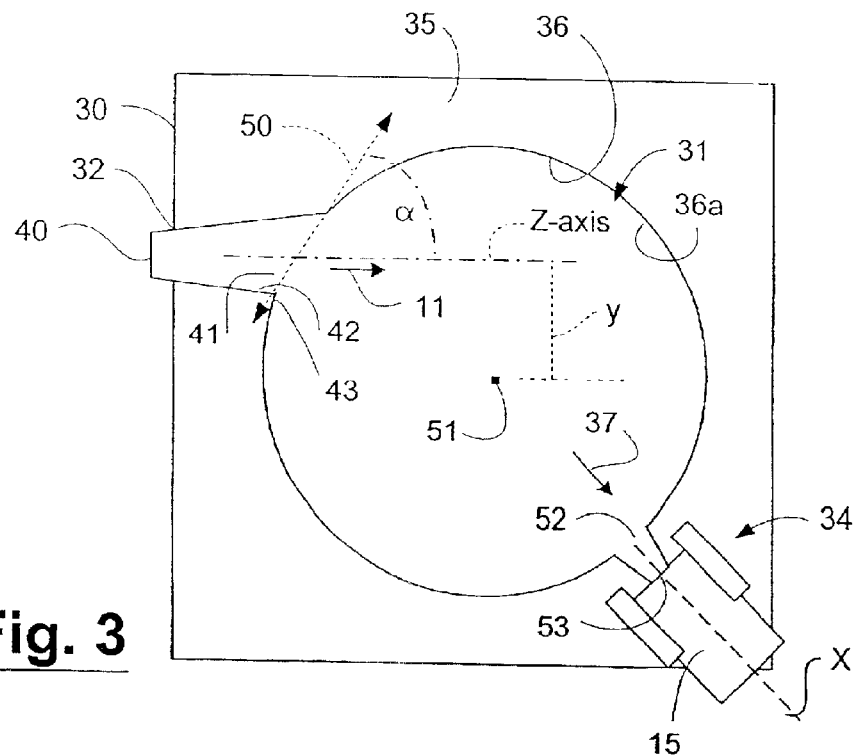
FIG. 3 is a schematic side elevation view, partly broken away in section, of an optical integrating sphere in accordance with the present invention.
Figure 4:
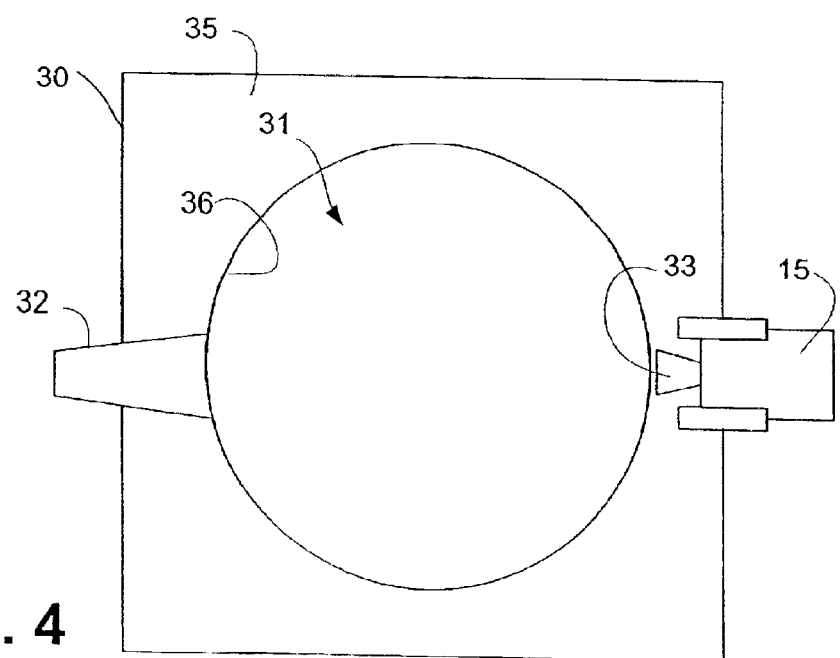
FIG. 4 is a top plan view, partly broken away in section, of the optical integrating sphere of FIG. 3.
Figure 5:
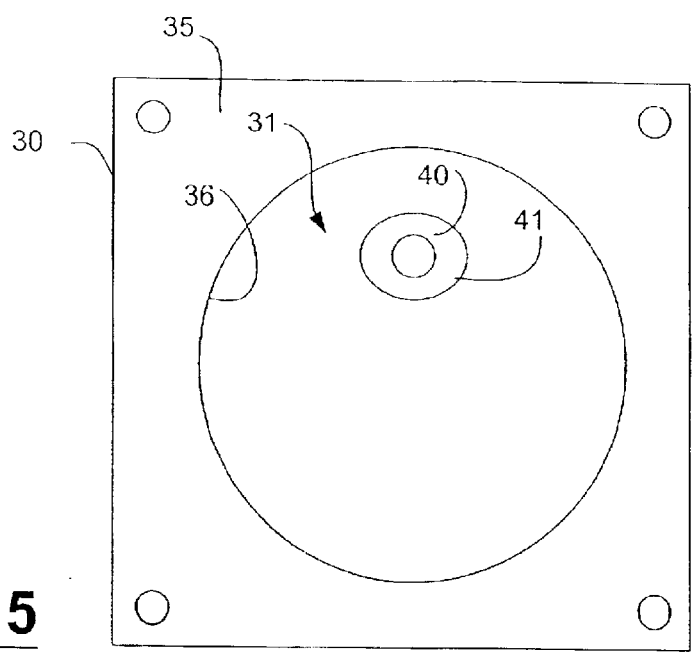
FIG. 5 is a front view, partly broken away in section, of the optical integrating sphere of FIGS. 3 and 4.

Referring more particularly to the drawings, wherein like reference numerals designate like parts in the several figures, and now specifically to FIGS. 3, 4 and 5, an optical integrating sphere 30 in accordance with the present invention is illustrated. The integrating sphere 30 is relatively small, for example, on the order of 1.5" diameter or smaller for the interior 31. In an embodiment the diameter of the interior is approximately 1" or less. In an embodiment the diameter is smaller than 1 inch. In the illustrated embodiment the integrating sphere of 30 is made of Spectralon material (by Labsphere, Inc., of North Sutton, N.H.), which is in the form of a cube having a substantially solid exterior, except for the hollow interior 31, light input port 32, light output port 33, and space 34 for the photosensitive detector generally indicated at 15, which may be any device able to provide a useful output in response to electromagnetic energy, such as light, incident thereon. An example of a suitable photosensitive detector is an indium gallium arsenide light sensitive diode. The integrating sphere 30 may be made of a single part or of multiple parts secured together to obtain a generally hollow spherical interior 31 with the respective input and output ports 32, 33, and space 34 for the photodetector 15. If desired, the integrating sphere 30 may be made of some other suitable material. The integrating sphere may be molded, cast, milled or otherwise formed.

In FIG. 3 the integrating sphere 30 is shown in side elevation view, broken away in section to show the interior 31 within the body 35 of the integrating sphere. The interior 31 is spherical and has a light reflecting wall or surface 36. The light input port 32 couples light from an optical fiber 21 to the interior 31 of the integrating sphere 30, and the light output port 33 provides an output path for output light 37 from the interior 31 to the photosensitive detector 15.

The wall 36 reflects at least some light incident thereon. The Spectralon material mentioned has a light transmissive characteristic or light translucency characteristic so that some light may be transmitted through the wall 36; however, desirably at least some of the Spectralon material forming the body 35 of the integrating sphere 30 reflects the light transmitted into that material back into the interior 31. In an exemplary embodiment the Spectralon material reflects light in a wavelength range of from about 750 nm to about 1640 nm. This range is not intended to be limiting, and it will be appreciated that the integrating sphere, whether of Spectralon or of some other material may reflect light in the same or different ranges.

Figure 1:
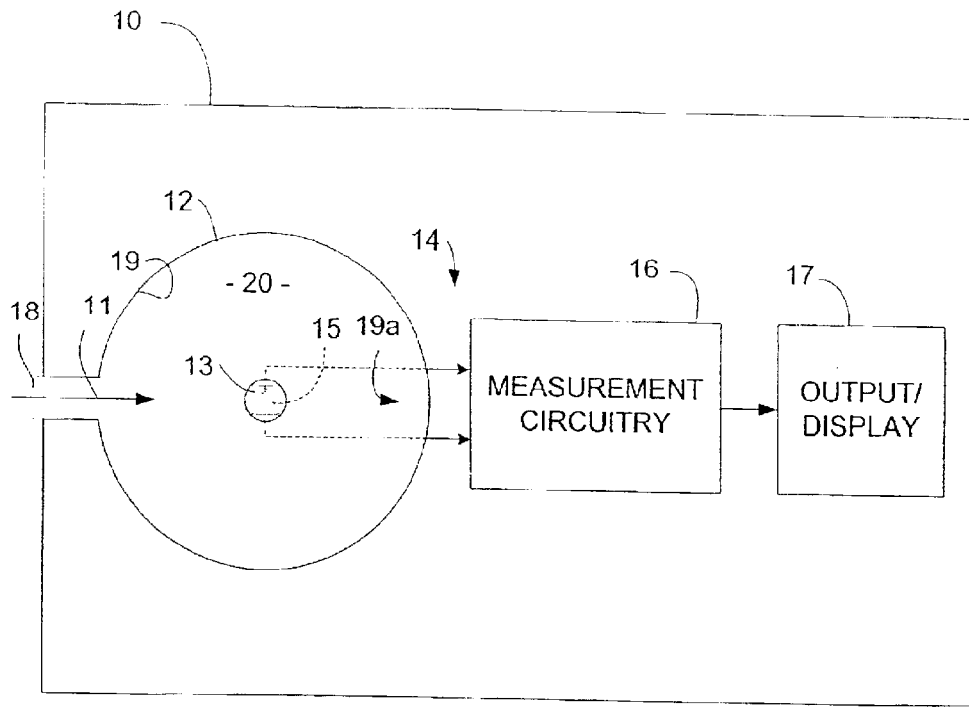
FIG. 1 is a schematic illustration of a prior art optical measurement instrument using a conventional relatively large integrating sphere.
Figure 2A:
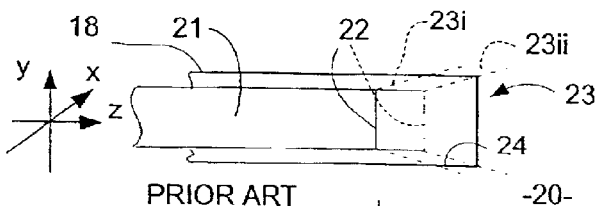
FIGS. 2A, 2B, and 2C are, respectively, schematic illustrations of an optical fiber located at the light inlet port of the integrating sphere of FIG. 1.
Figure 2B:
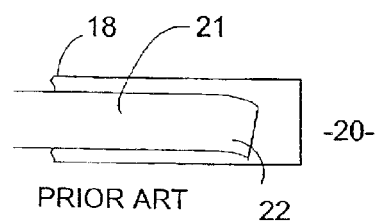
Figure 2C:
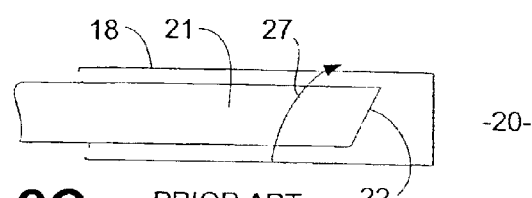

The light input port 32 and the light output port 33 are in relatively offset relation so there is no direct light path from the input port to the output port without light undergoing at least one and usually a number of reflections. In an embodiment of the invention, all or substantially all of the light input, i.e., provided, to the integrating sphere travels through a number of reflections between the light input port 32 and the light output port 33, which provides a number of advantages that improve reproducibility of measurements for the same power or intensity input light. Multiple reflections tend to randomize the optical polarization and also tend to distribute light on the photosensitive detector 15 relatively uniformly to avoid "hot spots" or locations of relatively intense illumination on the photosensitive detector relative to other locations thereon which might receive relatively lower intensity light. Although the light tends to remain polarized, in a sense the multiple reflections in the integrating sphere tends to scramble the polarization directions to minimize the impact of polarization on the optical measurements made using the integrating sphere 30. Increasing the number of "bounces" or reflections increases uniformity of distribution of polarization direction. Increasing the number of reflections also tends to reduce the affect of the types of variations shown in FIGS. 2A, 2B and 2C, for example, Z-axis variations (longitudinal positioning of the optical fiber in the inlet port 32), X- and Y-axis variations (lateral or side to side location of the optical fiber in the light input port 32), bending of the end of the optical fiber, and rotation of a sloped faceted end face 22 of the optical fiber.

As is illustrated in FIGS. 3, 4 and 5, the input port 32 (and the Z-axis thereof) is offset from a diameter of the integrating sphere by approximately ⅓ to ⅔ the distance of a radius of the integrating sphere (for example, a spherical integrating sphere). Stated another way, the input port 32 and the Z-axis thereof are approximately parallel to such diameter but are spaced away from the diameter by approximately ⅓ to ⅔ the distance along an arc quadrant of the integrating sphere. For the sake of discussion, the diameter referred to here is the horizontal centerline of the integrating sphere 30 as illustrated; however, it will be appreciated that such direction in the drawings, i.e., horizontal, is for illustrative purposes, and in use the integrating sphere may be rotated to other directions so that such horizontal diameter faces in another direction. Also, as is illustrated in FIGS. 3, 4 and 5, the shape of the light input port 32 is somewhat of truncated conical shape. The inlet end 40 of the input port 32 is relatively narrower than the outlet end 41 from which light enters the interior 31 of the integrating sphere 30. The conical wall 42 of the input port 32 meets or intersects with the interior wall 36 at a location 43 and that intersection is shown in the front view of FIG. 5 as an ellipse. The truncated conical shape of the light input port 32 is matched to the shape of the light cone 23 emanating from the end face 22 of the optical fiber 21. In a sense the shape of the light inlet port 32 and its interior wall 42 mimics the light cone 23. Such matching allows the optical fiber end face 22 to be at any Z-axis location along the length of the inlet port 32 while providing a substantially clear path for the light cone 23 to the interior 31 of the integrating sphere 30 without impinging on the wall 42 or with only relatively minimal impingement on the wall 42. The inlet end 40 of the inlet port 32 may fit closely to the optical fiber 21, its connector and/or adapter to minimize and preferably to avoid leakage of light reflected back into the inlet port from the interior 31 of the integrating sphere 30.

In an exemplary embodiment the variations in location of the end face 22 of the optical fiber 21 in the input port 32 is from about 0 to about 3 mm. Thus, the angle of taper, e.g., the angle of intersection of the wall 42 with the center axis of the truncated conical shape of the input port, i.e., the Z-axis, should be adequately large to minimize impingement of light in the light cone 23 on the wall 42, but that angle is not larger than necessary to carry out the function of guiding light into the integrating sphere interior 31 without impingement on the wall 42, thereby to minimize space for light to reflect back down into the light input port from the interior 31 of the integrating sphere 30. However, if the Z-axis variation distance permitted is limited, then the extent along the axis of the conical wall 42 that such taper is necessary also may be appropriately limited, this facilitating sealing against light leakage into or out from the integrating sphere 30. In another exemplary embodiment the inlet end 40 of the inlet port 32 is sealed to block light passage other than the light transmitted in the optical fiber 21, thus avoiding leakage out from or into the integrating sphere 30. In another exemplary embodiment the angle of such truncated conical wall 42 extends the entire or substantially the entire axial length of the axis (height) thereof, thereby to assure minimal impingement of light from the light cone without regard to the Z-axis location of the end face 22 in the light input port 32. In an embodiment the inlet port 32 has a "spread" of on the order of from about 20 degrees to about 30 degrees, and in one embodiment is on the order of about 24 degrees; such angle being the included angle at the apex where of the cone formed by the wall 42 and the Z-axis coincide.

It will be appreciated that regardless of the location of the end face 22 in the input port 32, the light cone 23 will not impinge on the conical wall 42 and, therefore, will not interfere with reproducibility, repeatability, accuracy and reliability of measurements made using the integrating sphere 30, regardless of the Z-axis location of the optical fiber end face 22.

As is illustrated in FIGS. 3 and 5, the light input port 32 is offset from a tangent illustrated by a dotted line 50 in FIG.

3 to the spherical interior wall 36. The offset angle is shown at alpha (α). The spacing of the Z-axis of the optical fiber 21 and the light input port 32 relative to the center 51 of the interior 31 of the integrating sphere 30 is shown by distance y in FIGS. 3 and 5. By offsetting the light input port 32 in this matter, the light input to the interior 31 of the integrating sphere 30 will tend to reflect from the area 36a of the wall 36 in directions that are other than directly back into the light input port 32. This tends to reduce and preferably to minimize the amount of reflected light that is reflected back into the light input port and, therefore, improves the reproducibility of optical measurements made using the optical integrating sphere 30.

FIG. 4 is a top view of the integrating sphere 30 of FIG. 3, but the illustration in FIG. 4 is projected to show the light input port 32 and light output port 33 opposite each other, even though those parts are rotated in a polar direction about an axis through the center 51 of the integrating sphere 30.

The location of the light output port 33 relative to the light input port 32 is shown as offset in a non-perpendicular and non-parallel relation in FIG. 3. More specifically the Z-axis direction (or line of sight) of the light input port 32 and the W-axis of line of sight or line of view of the light output port 33 are non-perpendicular and non-parallel. Also, in the illustrated embodiment, the W-axis line of sight of the output port 33 does not necessarily coincide with the center 51 of the integrating sphere. The described arrangement of the light input port and the light output port helps to assure that light must undergo a number of bounces or reflections in the interior 31 of the integrating sphere 30 before that light is detected by the photosensitive detector 15 at the light output port 33. In an exemplary embodiment the angle of the W-axis line of sight to a line perpendicular to the Z-axis direction is on the order of about 35 degrees.

As is illustrated in FIG. 3, the light output port 33 is of a truncated conical shape having a slightly larger inlet 52 at the interior wall 36 and a slightly narrower outlet 53 adjacent the photosensitive detector 15 to guide light from the interior 31 to the photosensitive detector. The truncated conical shape of the light output port 33 and the offset positioning thereof relative to the light inlet port 32 tends to optimize sensitivity of the measurements, e.g., by the photosensitive detector 15, for effective light detection with relatively minimal impact due to uncontrolled positioning variables, such as those of X, Y, and Z-axis alignment of the optical fiber at the light input port 32, angle of the optical fiber relative to the intended input angle, angle of light exiting the optical fiber due to the angle facet polishing or other uncontrolled causes, such as temperature, pressure, and humidity.

The offsetting of the input port 32 away from a diameter of the integrating sphere 30 increases the number of bounces or reflections of light in the integrating sphere and, thus, contributes to the uniformity of light reaching the output port 33 and the lack of polarization dependency on the measurements made by the photosensitive device 15. Uniformity of the light reaching the photosensitive device 15 minimizes variations in measurements due to input port, X, Y and Z-axis, light cone 23 impingement on the input port wall and polarization type variations, as were described above. The offsetting of the input port 32 away from a diameter of the integrating sphere also reduces the amount of light reflecting back out the inlet port. The offsetting of the outlet port 33 to a non-perpendicular and non-parallel relation to the input port 32 also increases the number of bounces or reflections of light between the inlet port and the outlet port and, thus, provides for minimizing measurement variations and the prior causes mentioned just above. By using one or more of the described techniques to increase reflection in the integrating sphere and to avoid loss or leakage of light, variations in measurements for light inputs of the same characteristics are minimized.

Figure 6:
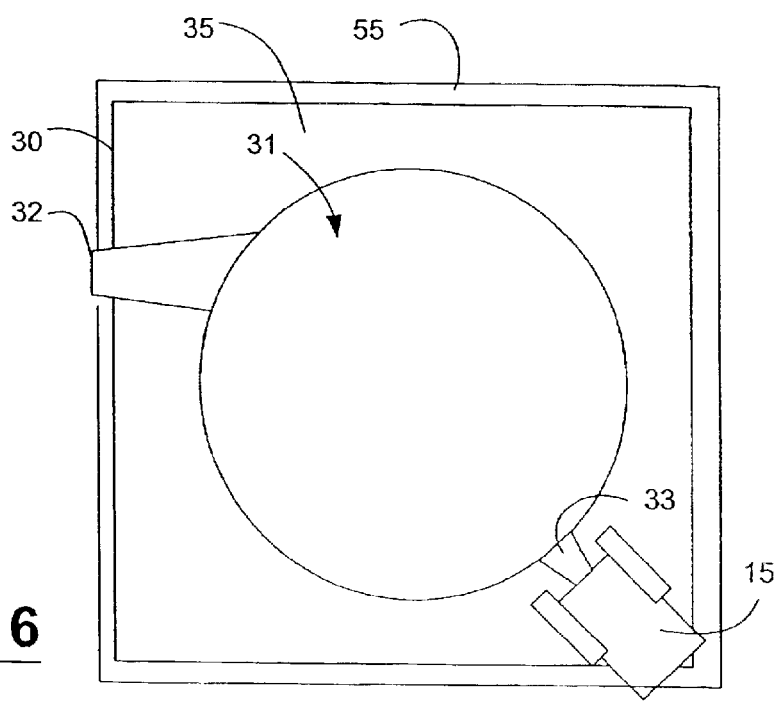
FIG. 6 is a schematic side elevation view, partly broken away in section, of another embodiment of optical integrating sphere including external reflector material.

As was mentioned above, the Spectralon material of which the body 35 of the optical integrating sphere 30 is made may have a translucent characteristic. The illustration of FIG. 6 is similar to the illustration of FIG. 3 but additionally shows reflector material 55 around at least part or all of the integrating sphere body 35. For large integrating spheres, the thickness of the body 35 is such that minimal light will escape the body without being reflected back into the interior 31 of the integrating sphere. However, for miniature integrating spheres of the type described in association with the instant invention, the thickness of the body 35 may be relatively minimal compared to those of larger integrating spheres, and, therefore, some light may transmit through the body 35 and otherwise escape the integrating sphere 30. To minimize such escape, if necessary and/or desired, additional light reflecting material represented schematically in FIG. 6 at 55 may be placed at selected locations or substantially entirely surrounding the exterior of the body 35. The light reflecting material may reflect light back into the body 35 for delivery back into the interior 31 of the integrating sphere 30. Examples of light reflecting material 55 include specular reflector, diffuse reflector and retro-reflector material.

Figure 7:
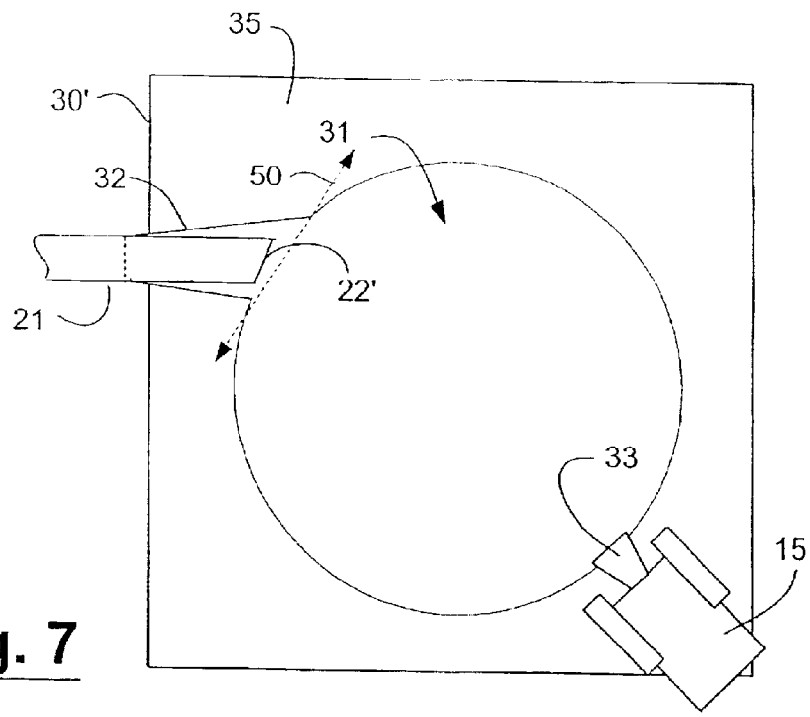
FIG. 7 is a schematic side elevation view, partly broken away in section, of another embodiment of optical integrating sphere in which the light input fiber optic device outlet face is substantially co-planar with the interior wall of the integrating sphere.

FIG. 7 illustrates another embodiment of optical integrating sphere 30' used with an optical fiber 21' located such that the end face 22' of the optical fiber is coplanar or near-coplanar with the interior wall 36 of the integrating sphere 30', e.g, with tangent 50. Using such orientation of the end of the optical fiber end face 22', the light cone 23 has virtually no possibility of reflecting from the conical wall 42.

Figure 8:
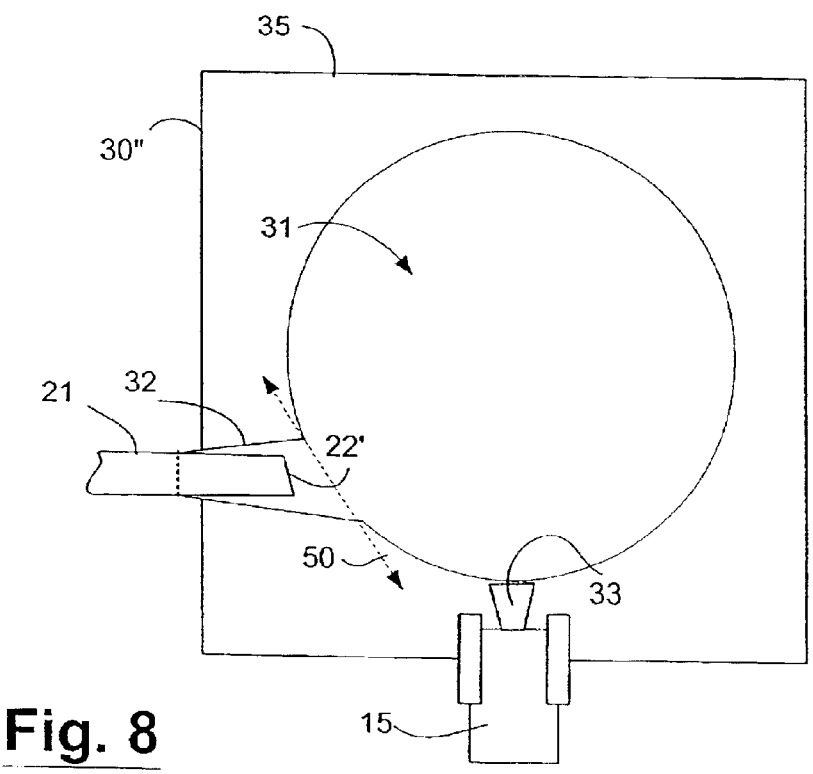
FIG. 8 is a schematic side elevation view, partly broken away in section, of another embodiment of optical integrating sphere in which the light input port is below the centerline of the integrating sphere, and the light output port also is below the centerline of the integrating sphere.

FIG. 8 illustrates another embodiment of optical integrating sphere 30" used with an optical fiber 21, which may be located as in the integrating sphere 30 of FIG. 3 or as in the integrating sphere 31 of FIG. 7. In the integrating sphere 30" the light inlet port 32 is below the centerline diameter of the integrating sphere, e.g., from approximately ⅓ to about ⅔ of the way to the bottom of the integrating sphere, as is illustrated. In the integrating sphere 30" the detector is at the bottom 69 of the integrating sphere 30". Operation of the integrating sphere 30" is similar to the operation of the operation of the integrating spheres 30 and 30' described above to obtain power-weighted average bounces of light prior to detection to obtain the operative features and advantages of the invention.

Figure 9:
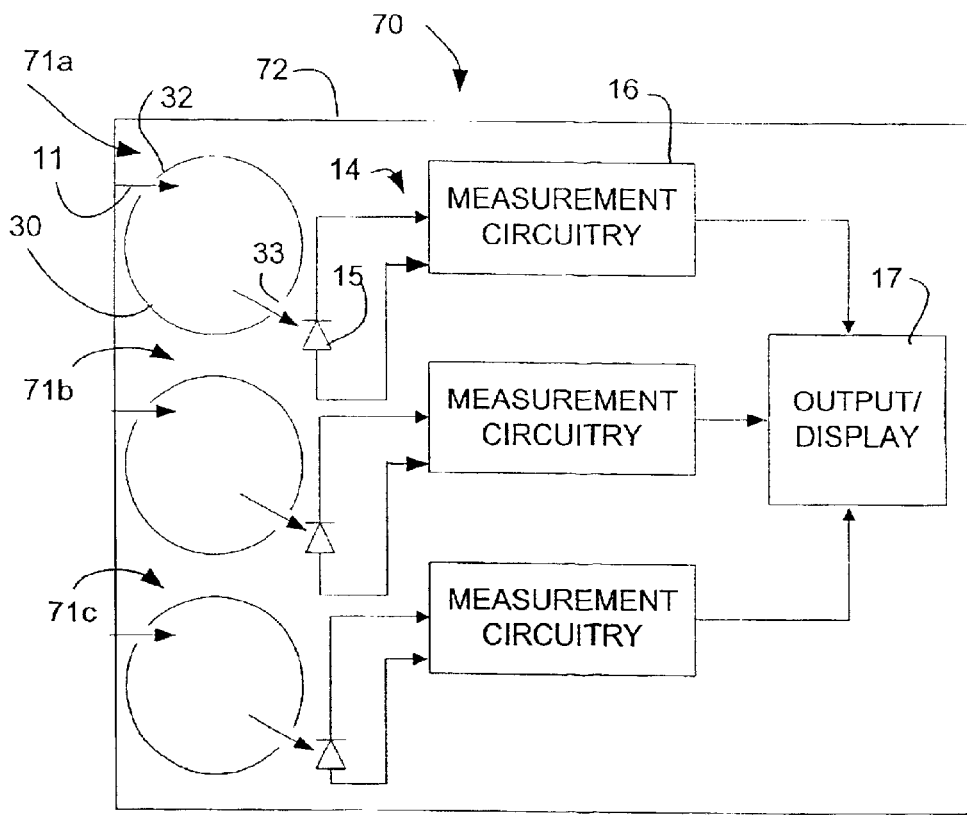
FIG. 9 is a schematic illustration of a multiple channel measurement instrument in accordance with an embodiment of the present invention.

Turning to FIG. 9, a measurement instrument 70 is illustrated. The measurement instrument includes a number of measurement channels 71a, 71b, and 71c. Each channel includes an integrating sphere 30, and an optical power meter (OPM) 14, including a photosensitive device 15 and measurement circuitry 16. Each of the measurement channels is connected to an output circuit and display 17. The output circuit and display 17 may be of the type that is able to provide the output and/or display function for all channels in the measurement instrument 70; or, if desired, a separate output circuit and display 17 may be provided for each channel. The measurement circuitry 16 may be conventional measurement circuitry available to measure signals from the detector 15 or the like, such as, for example, a photosensitive detector, whereby the signals measured are representative of optical power or some of some other measured parameter, characteristic of light or of some other measurable quantity.

The measurement instrument includes a housing 72 in which the integrating spheres and OPMs of the respective channels are contained. The integrating spheres 30 are relatively small, for example, being on the order of about 1½" or less in interior diameter. In an embodiment the integrating spheres 30 are 1" diameter or less. Since the integrating spheres 30 are relatively small, there is adequate space in the case 72 to contain a number of integrating spheres and respective measurement channels without requiring an excessively large case. In an embodiment the measurement instrument 70 may include nine or more integrating spheres and associated measurement channels. In another embodiment the measurement instrument may include twelve or more; and in another embodiment the measurement instrument may include twenty or more integrating spheres and associated measurement channels. The size of the integrating spheres may be the limiting factor in determining how many can be placed in the measurement instrument 70 and, therefore, how many channels can be measured by the measurement instrument. In many cases the electronic components of the measurement circuitry 16 and output circuit and display 17 may require much less space than does an integrating sphere. Consider, for example, if the integrating spheres were only approximately 1½ inches interior diameter and less about 2 inches external diameter, a measuring instrument having an array of six horizontal rows of ten integrating spheres each, an instrument having a total of sixty integrating spheres and, thus, sixty channels for measuring respective optical signals, would only require dimensions on the order of about eighteen to twenty inches across and about nine to fifteen inches height. This enables the relatively close packing of many optical measuring channels in the same measurement instrument, a packing and number of channels in such a relatively small footprint or form factor than was heretofore possible.

The output circuit and display 17 may include a respective output circuit and/or display for each of the channels. Alternatively, the output circuit and display may be coupled to a number of the channels to receive the signals representing the results of measurements made in the respective channels and to handle the data, to display the data, to store the data, etc. The output circuit and display 17 may include appropriate processor, memory, program instructions, and display, printer, etc. In using the measurement instrument 70, each of the measurement channels may be coupled to respective sources of light input 11. Each photosensitive device 15 detects light from the respective associated integrating sphere 30, and the measurement circuitry 15 in the respective channel provides signals representing the optical power, etc. for delivery to the output circuit and display 17. The data may be used as described above, for example, for graphical display, printed display, printing or displaying of numerical values, or for other uses, etc. Multiple channels can be operated simultaneously to make appropriate measurements separately, simultaneously, sequentially or otherwise, and the data may be provided the output circuit and display 17 for subsequent display and/or use.

Figure 10:
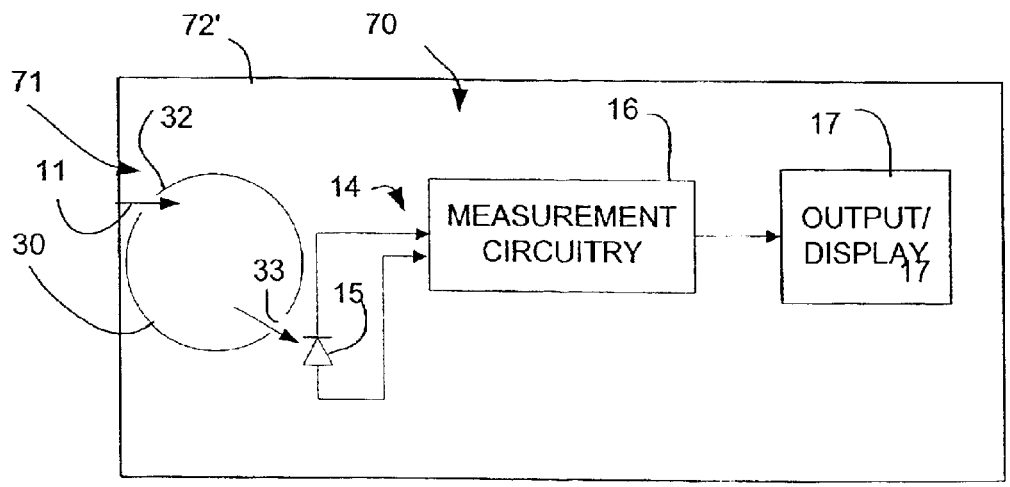
FIG. 10 is a schematic illustration of a compact single channel measurement instrument in accordance with an embodiment of the present invention.

Turning to FIG. 10, a measurement instrument 70' is illustrated. The measurement instrument is similar to the measurement instrument 70 of FIG. 9, except there only is one measurement channels 71. The output circuit and display 17 provides the output and/or display function for the single channel in the measurement instrument 70. Since the measurement instrument 70' uses only a single relatively small integrating sphere 30, e.g., on the order of one and one half inches diameter or less, or one of the other sizes mentioned above according to the invention, the size of the case 72' for the measurement instrument 70' can be relatively small and still accomplish the desired measurement functions described above.

Features of the integrating sphere embodiments may be used in other systems, especially optical systems, as will be appreciated.

INDUSTRIAL APPLICATION

The present invention may be used to measure optical signals.

What is claimed is:

1. An integrating sphere, comprising
a spherical volume having walls of a material for reflecting light, a light inlet and a light outlet, and
wherein a diameter axle bounds two hemispheres of the spherical volume, the light inlet is in one hemisphere of the spherical volume, the light outlet is in the other hemisphere of the spherical volume, and
relative to a diameter axis perpendicular to the first mentioned diameter axis, the light outlet is offset; and
wherein the light inlet, light outlet and walls are cooperatively related such that of the light entering the spherical volume via the light inlet, substantially all the light passing to the light outlet is via multiple reflections from the walls of the spherical volume.

2. An integrating sphere, comprising
a spherical volume having walls of a material for reflecting light, a light inlet and a light outlet, and
wherein a diameter axis bounds two hemispheres of the spherical volume, the light inlet is in one hemisphere of the spherical volume, the light outlet is in the other hemisphere of the spherical volume, and
the light outlet has an axis, and the axis is at an angle of about 35 degrees relative to a diameter axis perpendicular to the first mentioned diameter axis of the spherical volume.

3. An integrating sphere, comprising
a spherical volume having walls of a material for reflecting light, a light inlet and a light outlet, and
wherein a diameter axis bounds two hemispheres of the spherical volume, the light inlet is in one hemisphere of the spherical volume, the light outlet is in the other hemisphere of the spherical volume,
the light outlet has an axis that is generally parallel to and offset from the diameter axis; and
relative to a diameter axis perpendicular to the first mentioned diameter axis, the light outlet is offset.

4. The integrating sphere of claim 3, wherein the light outlet has an axis, and the light outlet axis is non-perpendicular to the first mentioned diameter axis.

5. The integrating sphere of claim 3, wherein the light outlet axis is at an angle of about 35 degrees relative to the diameter axis perpendicular to the first mentioned diameter axis of the spherical volume.

6. The integrating sphere of claim 1, wherein substantially all the light passing to the light outlet does so without impingement on an object external of the spherical volume.

7. The integrating sphere of claim 1, wherein the light inlet is tapered along at least part of its length from an inlet end to an outlet end from which light enters the spherical volume.

8. The integrating sphere of claim 7, wherein light provided the light inlet is provided in a conical shape, and the shape of the taper is at least approximately the same shape as such conical shape.

9. The integrating sphere of claim 7, wherein a cone formed by the intersection of a wall of the inlet and an axis of the inlet has an included angle of about 20 degrees to about 30 degrees.

10. The integrating sphere of claim 1, wherein the light outlet has a substantially truncated conical shape with larger a inlet portion than outlet portion from which light exits the spherical volume.

11. The integrating sphere of claim 1, wherein the spherical volume has a diameter of less than about 1.5 inches.

12. The integrating sphere of claim 1, wherein the spherical volume has a diameter of less than about 1.0 inch.

13. The integrating sphere of claim 2, wherein the light inlet is tapered along at least part of its length from an inlet end to an outlet end from which light enters the spherical volume.

14. The integrating sphere of claim 13, wherein light provided the light inlet is provided in a conical shape, and the shape of the taper is at least approximately the same shape as such conical shape.

15. The integrating sphere of claim 13, wherein a cone formed by the intersection of a wall of the inlet and an axis of the inlet has an included angle of about 20 degrees to about 30 degrees.

16. The integrating sphere of claim 2, wherein the light outlet has a substantIally truncated conical shape with larger a inlet portion than outlet portion from which light exits the spherical volume.

17. The integrating sphere of claim 2, wherein the spherical volume has a diameter of less than about 1.5 inches.

18. The integrating sphere of claim 2, wherein the spherical volume has a diameter of less than about 1.0 inch.

19. The integrating sphere of claim 3, wherein the light inlet is spaced from the diameter axis a distance of about one-third to about two-thirds of the radial dimension of the spherical volume.

20. The integrating sphere of claim 3, wherein the light inlet is tapered along at least part of its length from an inlet end to an outlet end from which light enters the spherical volume.

21. The integrating sphere of claim 20, wherein light provided the light inlet is provided in a conical shape, and the shape of the taper is at least approximately the same shape as such conical shape.

22. The integrating sphere of claim 20, wherein a cone formed by the intersection of a wall of the inlet and an axis of the inlet has an included angle of about 20 degrees to about 30 degrees.

23. The integrating sphere of claim 3, wherein the light outlet has a substantially truncated conical shape with larger a inlet portion than outlet portion from which light exits the spherical volume.

24. The integrating sphere of claim 3, wherein the spherical volume has a diameter of less than about 1.5 inches.

25. The integrating sphere of claim 3, wherein the spherical volume has a diameter of less than about 1.0 inch.

26. An integrating sphere for use in measuring input light, comprising:
    a spherical volume having walls of a material for reflecting light;
    a light inlet receiving input light and a light outlet directing light from the spherical volume for detection; and
    wherein the light inlet, light outlet and walls cooperate such that substantially all light passing to the light outlet for detection is directly from reflection by the walls of the spherical volume.

27. The integrating sphere of claim 26, wherein substantially all the light passing to the light outlet does so without impingement on an object external of the spherical volume.

28. The integrating sphere of claim 26, wherein the sphere comprises a single light inlet.

29. The integrating sphere of claim 28, wherein the sphere comprises a single light outlet.

30. The integrating sphere of claim 26, wherein the light inlet is tapered along at least part of its length from an inlet end to an outlet end from which light enters the spherical volume.

31. The integrating sphere of claim 30, wherein light provided the light inlet is provided in a conical shape, and the shape of the taper is at least approximately the same shape as such conical shape.

32. The integrating sphere of claim 30, wherein a cone formed by the intersection of a wall of the inlet and an axis of the inlet has an included angle of about 20 degrees to about 30 degrees.

33. The integrating sphere of claim 26, wherein the light outlet has a substantially truncated conical shape with larger a inlet portion than outlet portion from which light exits the spherical volume.

34. The integrating sphere of claim 26, wherein the spherical volume has a diameter of less than about 1.5 inches.

35. The integrating sphere of claim 26, wherein the spherical volume has a diameter of less than about 1.0 inch.

* * * * *

UNITED STATES PATENT AND TRADEMARK OFFICE
CERTIFICATE OF CORRECTION

PATENT NO. : 6,846,085 B2
DATED : January 25, 2004
INVENTOR(S) : Minneman et al.

It is certified that error appears in the above-identified patent and that said Letters Patent is hereby corrected as shown below:

Column 12,
Line 4, replace "axle" with -- axis --
Line 5, replace "is in one" with -- is in at least one --
Line 8, replace "outlet" with -- inlet --

Column 13,
Line 2, replace "substantlally" with -- substantially --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,846,085 B2
DATED : January 25, 2005
INVENTOR(S) : Minneman et al.

It is certified that error appears in the above-identified patent and that said Letters Patent is hereby corrected as shown below:

Column 12,
Line 4, replace "axle" with -- axis --
Line 5, replace "is in one" with -- is in at least one --
Line 8, replace "outlet" with -- inlet --

Column 13,
Line 2, replace "substantlally" with -- substantially --

This certificate supersedes Certificate of Correction issued April 26, 2005.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,846,085 B2 | Page 1 of 1 |
| APPLICATION NO. | : 10/053751 | |
| DATED | : January 25, 2005 | |
| INVENTOR(S) | : Minneman et al. | |

It is certified that error appears in the above-identified patent and that said Letters Patent is hereby corrected as shown below:

Abstract, line 1, replace "An" with --A--

Drawing Sheet 4, Figure 7, replace reference numeral "21" with --21'--

Drawing Sheet 4, Figure 8, add reference numeral 69 to point to the "bottom" of the integrating sphere 30"

Drawing Sheet 5, Figure 10, replace reference numeral "70" with --70'--

Col. 1, line 29, replace "form" with --from--

Col. 2, line 32, delete "of the end portion"

Col. 2, lines 46-47, replace "indifferent" with --in different--

Col. 2, line 55, replace "20" with --22--

Col. 2, line 57, delete "does"

Col. 5, line 31, replace "refection" with --reflection--

Col. 9, line 6, replace "matter" with --manner--

Col. 10, line 64, replace "power or some of" with --power or of--

Col. 11, line 53, replace "provided the output" with --provided to the output--

Signed and Sealed this

Twelfth Day of December, 2006

JON W. DUDAS
*Director of the United States Patent and Trademark Office*